United States Patent
Brehmer

(10) Patent No.: US 9,477,270 B2
(45) Date of Patent: Oct. 25, 2016

(54) ELECTRONIC DEVICE

(71) Applicant: Lenovo (Beijing) Co., Ltd., Beijing (CN)

(72) Inventor: Jesper Brehmer, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 123 days.

(21) Appl. No.: 14/465,979

(22) Filed: Aug. 22, 2014

(65) Prior Publication Data
US 2015/0253816 A1    Sep. 10, 2015

(30) Foreign Application Priority Data

Mar. 10, 2014   (CN) .......................... 2014 1 0085608

(51) Int. Cl.
*G06F 1/16* (2006.01)
*H01R 13/44* (2006.01)

(52) U.S. Cl.
CPC ........... *G06F 1/1684* (2013.01); *G06F 1/1656* (2013.01)

(58) Field of Classification Search
CPC ............................ G06F 1/1684; G06F 1/1656
USPC ............ 361/679.01–679.45, 679.55–679.59; 439/131
See application file for complete search history.

(56) References Cited

U.S. PATENT DOCUMENTS

| | | | | |
|---|---|---|---|---|
| 7,244,129 B2* | 7/2007 | Reid | ..................... | G06F 1/1616 439/131 |
| 8,348,684 B2* | 1/2013 | Ladouceur | .......... | H04M 1/0274 439/131 |
| 2010/0240235 A1* | 9/2010 | Hung | ..................... | H01R 31/06 439/131 |
| 2011/0008980 A1* | 1/2011 | Obata | .................. | G11B 33/025 439/131 |
| 2011/0124210 A1* | 5/2011 | Lai | ........................ | G06F 1/1632 439/131 |
| 2011/0136355 A1* | 6/2011 | Delpier | ................ | G06F 1/1613 439/131 |
| 2011/0261519 A1* | 10/2011 | Chiu | ..................... | G06F 1/1616 361/679.02 |
| 2011/0273832 A1* | 11/2011 | Tracy | .................... | G06F 1/1656 361/679.31 |
| 2012/0140422 A1* | 6/2012 | Park | ...................... | G06F 1/1675 361/724 |
| 2013/0107465 A1* | 5/2013 | Huang | .................... | H05K 7/16 361/725 |
| 2013/0224972 A1* | 8/2013 | Yang | .................. | H01R 13/7031 439/131 |

* cited by examiner

*Primary Examiner* — Nidhi Thaker
(74) *Attorney, Agent, or Firm* — Harness, Dickey & Pierce, P.L.C.

(57) ABSTRACT

An electronic device is provided, comprising: a first case having a first accommodating space, where a first surface of the first case has a first opening for the first accommodating space; and an interface part having a bottom surface with a same shape as the first opening, where the bottom surface is a cross section with a greatest area of the interface part. M I/O interfaces are disposed inside the interface part, and connecting ports of the M I/O interfaces are exposed on a first surface of the interface part which is not the bottom surface, M is an integer greater than or equal to 1; and the M I/O interfaces are connected to a circuit board located inside the first case.

9 Claims, 2 Drawing Sheets

ELECTRONIC DEVICE

The present application claims the priority to Chinese Patent Application No. 201410085608.9, entitled as "ELECTRONIC DEVICE", filed on Mar. 10, 2014 with Chinese State Intellectual Property Office, which is incorporated herein by reference in its entirety.

FIELD

The disclosure relates to the filed of electronics, and in particular to an electronic device.

BACKGROUND

An I/O interface, which includes multiple special registers and corresponding control logic circuits, is a common electronic circuit in an electronic device for information exchange between a CPU and an external I/O device, such as an IC (integrated circuit) chip or an interface board.

In conventional technology, one or more I/O interfaces are disposed on a side of an electronic device such as a computer, and the I/O interfaces are exposed outside the computer. Information transmission can be implemented by connecting an external device to one of the I/O interfaces.

However, in the conventional technology, the I/O interfaces are disposed on the side of the computer and are exposed to the outside, therefore, dust and dirt easily come into the I/O interfaces and thus affect connection performance of the I/O interface. In addition, the I/O interfaces disposed on the side of the computer make structure of the side of the computer irregular. In addition, the edge of the computer becomes thinner and thinner for better appearance and portability, however, disposing the thick I/O interface on the edge of the computer makes the edge of the computer thick, which limits development of super-thin edge of the computer, and thus affects the appearance and portability.

SUMMARY

An electronic device is provided according to embodiments of the disclosure, to solve the conventional problem that the I/O interfaces are disposed on the side of the computer and are exposed to the outside, which leads to dust and dirt affecting connection performance, an irregular structure of the edge and limited development of super-thin edge. The technical solutions are as follows.

An electronic device is provided, the electronic device includes:

a first case having a first accommodating space, where a first surface of the first case has a first opening for the first accommodating space; and an interface part having a bottom surface, where the bottom surface has a same shape with the first opening, the bottom surface is a cross section with a greatest area of the interface part, M I/O interfaces are disposed inside the interface part and connecting ports of the M I/O interfaces are exposed on a first surface of the interface part which is not the bottom surface, M is an integer greater than or equal to 1; the M I/O interfaces are connected to a circuit board located inside the first case, where in a case that the interface part is entirely accommodated in the first accommodating space through the first opening, a complete surface is formed by the bottom surface of the interface part and the first surface of the first case and the first surface of the interface part is accommodated in the first accommodating space; and in a case that the interface part is separated from the first accommodating space through the first opening, the first surface of the interface part is exposed.

Optionally, the electronic device may further include a connecting band made of flexible material, where a first end of the connecting band made of flexible material is fixedly connected to the interface part, and a second end of the connecting band made of flexible material is fixedly connected to the first case, and where the connecting band made of flexible material is configured to keep a connection state between the interface part and the electronic device in a case that the interface part is separated from the first accommodating space through the first opening.

Optionally, the connecting band made of flexible material includes an electrical connecting wire of the M I/O interfaces, where the electrical connecting wire of the M I/O interfaces is electrically connected to the circuit board.

Optionally, the first case may further include a second accommodating space and a second opening for the second accommodating space, where the second opening has a same shape with the connecting band made of flexible material, the second opening is connected to the first opening and the second accommodating space is connected to the first accommodating space; in a case that the interface part is entirely accommodated in the first accommodating space through the first opening, the connecting band made of flexible material is entirely accommodated in the second accommodating space through the second opening, and a bottom surface of the connecting band made of flexible material completely covers the second opening.

Optionally, at least the bottom surface of the interface part is made of flexible material, the interface part and the connecting band made of flexible material are molded in one body; in a case that the interface part is entirely accommodated in the first accommodating space through the first opening and the connecting band made of flexible material is entirely accommodated in the second accommodating space through the second opening, a complete surface is formed by the bottom surface of the interface part, the bottom surface of the connecting band made of flexible material and the first surface of the first case. Alternatively, at least the bottom surface of the interface part and the first surface of the first case are made of flexible material; in a case that the interface part is entirely accommodated in the first accommodating space through the first opening and the connecting band made of flexible material is entirely accommodated in the second accommodating space through the second opening, a complete surface with a consistent appearance is formed by the bottom surface of the interface part, the bottom surface of the connecting band made of flexible material and the first surface of the first case.

Optionally, a thickness of a second part of the first case in a reference direction is smaller than a thickness of a first part of the first case in the reference direction, and the first accommodating space is located on the first part, and the second accommodating space is located on the second part.

Optionally, the electronic device may further include a magnet disposed on the interface part, and the interface part is entirely accommodated in the first accommodating space through the first opening by the magnet.

Optionally, the first surface of the first case may be a surface of the first case where a display screen is not exposed.

Optionally, the electronic device may further include a second case, where the second case includes at least a display unit, and the display screen of the display unit is exposed through a first surface of the second case; the second case is rotatably connected to the first case; and in a case that the second case and the first case are in a first relative position, the first surface of the second case is opposite to the first surface of the first case.

Optionally, in a case that a thickness of the interface part is greater than the thickness of the first part of the first case in the reference direction, the first accommodating space of the first case extends toward a second surface of the first case to form a bulge, and in a case that the interface part is entirely accommodated in the first accommodating space through the first opening, a complete surface is formed by the bottom surface of the interface part and the first surface of the first case; and the bulge is further configured to support the electronic device via a supporting plane.

In the disclosure, a first accommodating space is provided on a first surface of a first case of an electronic device, to accommodate an interface part provided with the I/O interface. In a case that the interface part is to be used, the interface part is separated from the first accommodating space and is connected to an external device. In a case that the interface part is not used, the interface part is snap-fitted into the first accommodating space, so that the interface part is concealed and pollution from dust and dirt can be avoided, so as to ensure connection performance of the I/O interface. In addition, in a case that the interface part is not used, the interface part is snap-fitted into the first accommodating space to be concealed, to avoids exposed openings on the electronic device, and a complete surface is formed by a bottom surface of the interface part and the first surface of the first case, so that external structure of the electronic device is regular and simple. In addition, the first accommodating space is disposed on a position of the first surface with enough thickness to conceal the interface part, rather than disposed on the thin edge which can not accommodate the thick interface part, therefore, the development of superthin edge is not affected by the interface part 41, and thus better appearance and portability are ensured.

BRIEF DESCRIPTION OF THE DRAWINGS

To describe the technical solutions of embodiments of the present disclosure more clearly, the following briefly describes the drawings involved in the embodiments of the present disclosure. Apparently, the drawings described below are some embodiments, and those skilled in the art can obtain other drawings according to these drawings without any creative effort.

DETAILED DESCRIPTION OF THE EMBODIMENTS

To make the technical solutions clearer, the embodiments of the disclosure are further described in detail in the following in conjunction with drawings.

First Embodiment

Figure 1:
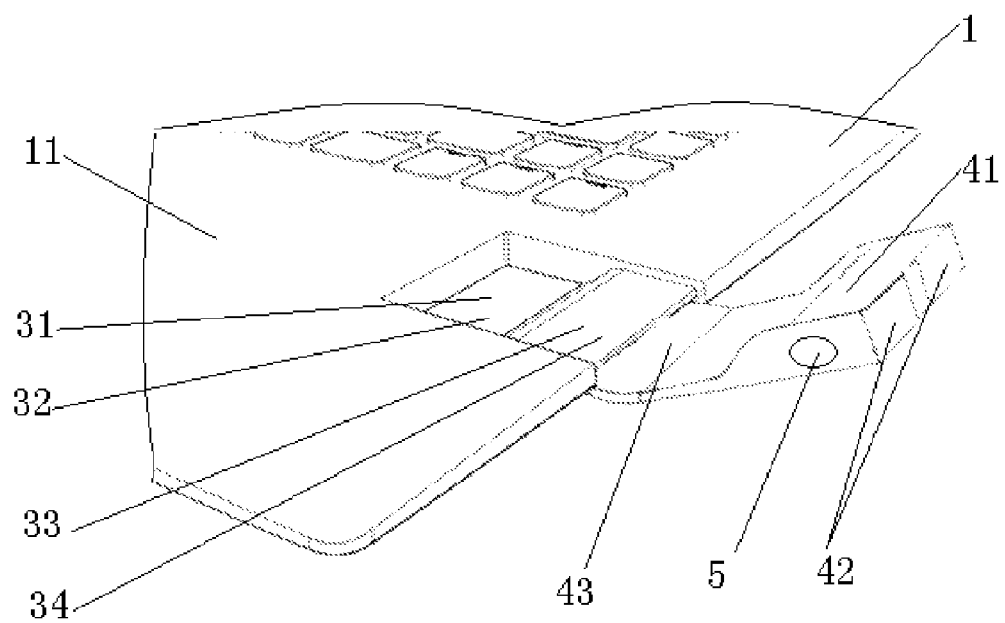
FIG. 1 is a schematic structural diagram of an electronic device according to an embodiment of the disclosure.

As shown in FIG. 1, an electronic device is provided according to the embodiment of the disclosure. The electronic device includes a first case 1 and an interface part 41.

The first case 1 has a first accommodating space 32, and a first surface 11 of the first case 1 has a first opening 31 for the first accommodating space 32.

The interface part 41 has a bottom surface 411, and the bottom surface 411 has a same shape as the first opening 31. The bottom surface 411 is a cross section with a greatest area of the interface part 41. M I/O interfaces 42 are disposed inside the interface part 41, and connecting ports of the M I/O interfaces 42 are exposed through a first surface of the interface part which is not the bottom surface 411, where M is an integer greater than or equal to 1. The M I/O interfaces 42 are connected to a circuit board located inside the first case 1.

In a case that the interface part 41 is entirely accommodated in the first accommodating space 32 through the first opening 31, a complete surface is formed by the bottom surface 411 of the interface part 41 and the first surface 11 of the first case 1, and the first surface of the interface part 41 is accommodated in the first accommodating space 32. In a case that the interface part 41 is separated from the first accommodating space 32 through the first opening 31, the first surface of the interface part 41 is exposed.

The interface part 41 is an integration of the I/O interfaces 42. The interface part 41 may be provided with one or more I/O interfaces 42 as needed. The interface part 41 is connected to a circuit board in the electronic device via a wire or wireless connection, to implement connection between an external device and the I/O interfaces 42, thereby implementing transmission of information. In a case that the I/O interfaces 42 are not used, the I/O interfaces 42 along with the interface part 41 are snap-fitted into the first accommodating space 32 to be concealed. The I/O interfaces 42 may be disposed on any surface of the interface part 41 except the bottom surface 411, i.e., the first surface of the interface part 41, as long as the I/O interfaces can be concealed inside the first accommodating space 32; in this case, the top surface of the interface part 41 is the bottom surface 411 of the interface part 41, and the bottom surface 411 just covers the first opening 31, to form a complete surface of the electronic device with the first surface 11 of the first case 1, thereby achieving better appearance. If the I/O interfaces 42 are to be used, the interface part 41 is separated from the first accommodating space 32 to expose the I/O interfaces 42 to facilitate the interface part to be connected to an external device. The electronic device, due to its inside components such as a circuit board, generally has a great volume or great thickness, so the electronic device is currently designed to have an arc shape with its middle part thick and its edge thin for better appearance, therefore, the thin edge can not adapted to the thick I/O interfaces 42. With the embodiment of the disclosure, in the arc structure, the first accommodating space 32, whose thickness adapts to the thickness of the I/O interface 42, is disposed on the first surface 11 of the first case 1, to completely accommodate the I/O interface 42, therefore, the design of edge thickness is not affected. That is, the first accommodating space 32 for accommodating the thick I/O interface 42 should be located on the thick middle part of the electronic device. In this case, the I/O interface 42 fits the appearance of the electronic device, and necessary connecting function can also be implemented.

In the disclosure, the first accommodating space 32, which is disposed on the first surface 11 of the first case 1 of the electronic device, is configured to accommodate the interface part 41 provided with the I/O interface 42. In a case that the interface part is used, the interface part 41 is separated from the first accommodating space 32 and is connected to an external device. In a case that the interface part 41 is not used, the interface part 41 is snap-fitted into the first accommodating space 32, so that the interface part 41 is concealed and pollution from dust and dirt can be avoided, so as to ensure connection performance of the I/O interface 42. In addition, in a case that the interface part 41 is not used, the interface part 41 is snap-fitted into the first accommodating space 32 to be concealed, which avoids exposed openings outside the electronic device; further, a complete surface is formed by the bottom surface 411 of the interface part 41 and the first surface 11 of the first case 1, so that the external structure of the electronic device is regular and simple; further, the first accommodating space 32 is disposed on the position of the first surface 11 with enough thickness to conceal the interface part 41, rather than disposed on the thin edge which can not accommodate the thick interface part 41, therefore, the development of super-thin edge is not affected by the interface part 41, and thus better appearance and portability are ensured.

As shown in FIG. 1, the electronic device further includes a connecting band made of flexible material 43, the connecting band 43 has a first end fixedly connecting to the interface part 41 and a second end fixedly connecting to the first case 1.

The connecting band made of flexible material 43 is configured to keep a connection state between the interface part 41 and the electronic device if the interface part 41 is separated from the first accommodating space 32 through the first opening 31.

The connecting band 43 is disposed to prevent losing of the interface part 41 when the interface part 41 is separated from the electronic device, and also configured for functions such as positioning of the interface part 41. The connecting band 43 may be directly connected to the electronic device or be connected to the electronic device through a rotation shaft, which is not limited herein. The flexible material may be, for example, rubber, silica gel, and plastic.

Preferably, the connecting band made of flexible material 43 includes electrical connecting wires of the M I/O interfaces 42.

In a case that the second end of the connecting band made of flexible material 43 is fixedly connected to the first case 1, the electronic connecting wires of the M I/O interfaces 42 are connected to the circuit board. In a case that the interface part 41 is connected to the electronic device by a wired connection, connection and information transmission between the I/O interface 42 and the circuit board may be implemented by electrical connecting wires. The electrical connecting wires may be covered with flexible material with an insulation function or a protection function, in this case, the connecting band 43 may have a function of wired connection.

As shown in FIG. 1, the first case 1 further has a second accommodating space 34 and a second opening 33 for the second accommodating space 34. The second opening 33 is connected to the first opening 31 and the second accommodating space 34 is connected to the first accommodating space 32. The second opening 33 has a shape adapted to the connecting band made of flexible material 43.

In a case that the interface part 41 is entirely accommodated in the first accommodating space 32 through the first opening 31, the connecting band made of flexible material 43 is entirely accommodated in the second accommodating space 34 through the second opening 33, and a bottom surface of the connecting band made of flexible material 43 just covers the second opening 33.

The first case 1 is provided with the second opening 33 to accommodate the connecting band made of flexible material 43 through the second opening 33, and the second opening 33 has a shape adapted to the connecting band 43, therefore, the connecting band 43 is just accommodated in the second opening 33. The first opening 31 is configured to accommodate the interface part 41 and the second opening 33 is connected to the first opening 31, so that in a case that the interface part 41 is snap-fitted into the first accommodating space, the two connecting spaces of the first opening 31 and the second opening 33 may just accommodate the interface part 41 and the connecting band 43, thus after the interface part 41 is snap-fitted into the first accommodating space, a complete surface is formed by the bottom surface 411 of the interface part 41, the bottom surface of the connecting band 43 and the first surface 11 of the first case 1, to achieve a better appearance of the electronic device. In a case that the second opening 33 is disposed on an edge of the electronic device, the second opening 33 may have an opening facing the upper direction and an opening facing the side direction, in this case, the connecting band 43 has two surfaces which just cover the second opening 33 respectively from the upper direction of the second opening 33 and the side direction of the second opening 33, to achieve a better appearance of the electronic device.

Figure 2:
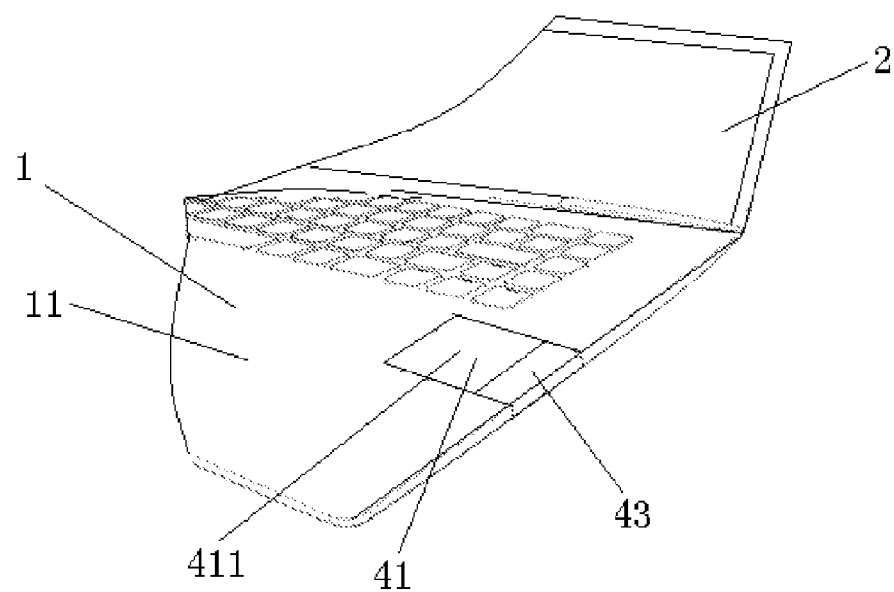
FIG. 2 is a schematic structural diagram of an electronic device according to another embodiment of the disclosure.

Preferably, as shown in FIG. 1 or FIG. 2, at least the bottom surface 411 of the interface part 41 is made of flexible material, and the interface part 41 and the connecting band made of flexible material 43 are molded in one body; in a case that the interface part 41 is entirely accommodated in the first accommodating space 32 through the first opening 31 and the connecting band made of flexible material 43 is entirely accommodated in the second accommodating space 34 through the second opening 33, a complete surface is formed by the bottom surface 411 of the interface part 41, the bottom surface of the flexible connecting band 43 and the first surface of the first case 1. Alternatively, at least the bottom surface 411 of the interface part 41 and the first surface 11 of the first case 1 are made of flexible material; in a case that the interface part 41 is entirely accommodated in the first accommodating space 32 through the first opening 31 and the connecting band made of flexible material 43 is entirely accommodated in the second accommodating space 34 through the second opening 33, a complete surface is formed by the bottom surface 411 of the interface part 41, the bottom surface of the flexible connecting band 43 and the first surface of the first case 1, to achieve a better appearance.

Material for the bottom surface 411 of the interface part 41, the connecting band 43 and the first surface 11 of the first case 1 may be flexibly selected as needed, as long as the electronic device has a complete surface with a consistent appearance.

Preferably, as shown in FIG. 1, the thickness of a second part of the first case 1 in a reference direction is smaller than the thickness of a first part of the first case 1 in the reference direction, and the first accommodating space 32 is located in the first part and the second accommodating space 34 is located in the second part.

Preferably, based on different thicknesses of the I/O interface 42 and the connecting band 43 in practice, the first accommodating space 32, which is configured to accommodate the thick I/O interface 42, is disposed on the first part of the first case 1 having a great thickness, which is generally a non-edge part of the electronic device, and the second accommodating space 34, which is configured to accommodate the thin connecting band 43, is disposed on the second part of the first case 1 having a less thickness. For example, for the electronic device with an arc-shaped case, the edge part is thin and is configured as the second part which is provided with the second accommodating space 34 to accommodate the thin connecting band 43, the middle part is thick and is configured as the first part which is provided with the first accommodating space 32 to accommodate the thick I/O interface 42, in this way, the thick I/O interface 42 of the interface part 41 just fits the thick middle part, and the thin connecting band 43 just fits the thin edge part. Structure design is more reasonable in this way, with both the basic function of the electronic device and the development of super-thin edge being ensured, and a better appearance and portability of the electronic device are achieved.

As shown in FIG. 1, the electronic device further includes a magnet 5, which is disposed on the interface part 41, and the first opening is entirely accommodated in the first accommodating space 32 through the first opening 31 by the magnet 5. The magnet 5 may be embedded in any side of the interface part 41. In a case that the interface part 41 is snap-fitted into the first accommodating space 32, the magnet 5 attracts metal of the first case 1 of the electronic device, to achieve positioning of the interface part 41. The magnet 5 may be flexibly disposed as needed, such as disposed inside the first accommodating space 32.

Preferably, the first surface 11 of the first case 1 is a surface of the first case 1 on which a display screen is not exposed. To avoid a confliction between snap-fit of the interface part 41 and the display screen, the first accommodating space 32 configured to accommodate the interface part 41 is disposed on a surface without the display screen, i.e., the first surface 11, for example, the back cover of the electronic device such as a mobile phone, a PAD, i.e., the opposite side of the display screen. The position of the first accommodating space 32 may be set as needed.

As shown in FIG. 2, the electronic device may further include a second case 2 having at least a display unit. A display screen of the display unit is exposed through a first surface of the second case 2 and the second case 2 is rotatably connected to the first case 1. In a case that the second case 2 and the first case are in a first relative position, the first surface of the second case 2 is opposite to the first surface 11 of the first case 1.

According to the embodiment, the electronic device may be a laptop, and the second case 2 with the display screen and the first case 1 with a keyboard are independent from each other. The first accommodating space 32 configured to accommodate the interface part 41 is disposed on the first case 1 without the display screen, so that the display screen is not affected by the first accommodating space. In a case that the laptop is folded, the second case 2 with the display screen and the first case 1 with the keyboard are located in a first relative position, that is, the first surface of the second case 2 is opposite to the first surface 11 of the first case 1.

Figure 3:
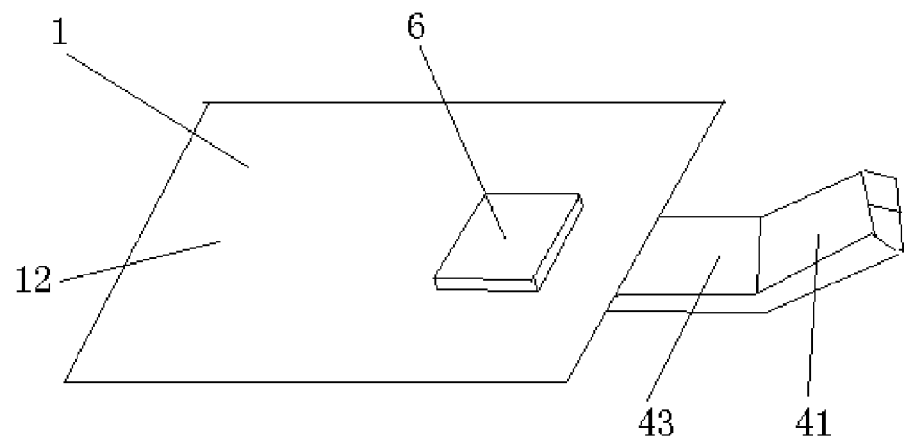
FIG. 3 is a schematic structural diagram of an electronic device according to anther embodiment of the disclosure.

Preferably, as shown in FIG. 3, in a case that the thickness of the interface part 41 is greater than the thickness of the first part of the first case 1 in the reference direction, the first accommodating space 32 of the first case 1 extends toward a second surface 12 of the first case 1 and forms a bulge 6, so that in a case that the interface part 41 is entirely accommodated in the first accommodating space 32 through the first opening 31, a complete surface is formed by the bottom surface 411 of the interface part 41 and the first surface 11 of the first case 1.

The bulge 6 is also configured to support the electronic device via a supporting surface.

According to the embodiment of the disclosure, based on actual thickness of the I/O interface 42, the first accommodating space 32 is disposed on the first part of the first case 1 having the great thickness, i.e., a non-edge part of the electronic device, to accommodate the thick I/O interface 42. In this case, if the thickness of the first part of the first case 1 is smaller than the thickness of the interface part 41, that is, the thickness of the first accommodating space 32 disposed on the first part is not enough and the first accommodating space 32 can not entirely accommodate the interface part 41, the first accommodating space 32 is extended toward another side, which is the second surface 12, opposite to the first surface 11 of the first case 11, to form a bulge 6 or a structure similar to a D-type cover on the second surface 12 by the first accommodating space 32, to ensure a complete surface formed by the bottom surface 411 of the interface part 41 and the first surface 11 of the first case 1. For example, a surface of a laptop where a keyboard is located is the first surface 11, and a surface opposite to the first surface 11, i.e., the bottom of the computer, is the second surface 12, the first accommodating space 32 is disposed on the first surface 11 and extended toward the second surface 12, to form a bulge 6 or a D-type cover on the bottom of the computer, so that the first accommodating space 32 can entirely accommodate the interface part 41, and a complete surface is formed by the bottom surface 411 of the interface part 41 and the first surface 11 of the first case 1. The bulge 6 or the D-type cover may also be configured to support the electronic device.

Second Embodiment

As shown in FIG. 1 or FIG. 2, an electronic device, which is a laptop in the embodiment, is provided according to the embodiment of the disclosure. A surface where a keyboard is located is a first surface 11 of a first case 1 and a case where a display screen is located is a second case 2. A first opening 31 is disposed on a portion of the first surface 11, and the first opening 31 is located on a non-edge part of the laptop. An inner part of the first opening is a first accommodating space 32. A second opening 33 connecting with the first opening 31 is disposed on a portion of the first surface 11, and an end of the second opening 33 is located on an edge of the laptop. The second opening 33 is a groove structure, viewing from the side of the laptop. A connecting band made of flexible material 43 is connected to the groove, and the connecting band has two surfaces which are perpendicular to each other; one surface entirely covers the groove of the second opening 33 from the side of the laptop, and the other surface is right above the second opening 33 and entirely covers the second opening 33 from the top, so that the connecting band 43 is completely adapted to the second opening 33, and a complete surface is formed. The other end of the connecting band 43 is connected to the interface part 41. The interface part 41 is provided with one or more I/O interfaces 42, which are configured to connect to an external device for transmitting information. For better appearance, the whole laptop generally has an arc-shaped case, that is, core components such as circuit boards are disposed in the middle part of the laptop, and the edge is designed to be thin. In this case, the first opening 31 is disposed on a non-edge position close to the middle of the laptop, which is generally thick and is large enough to accommodate the thick I/O interfaces. In a case that the I/O interfaces are not used, the interface part 41 and the connecting band 43 are turned toward the first opening 31 and the second opening 33 with a connecting position between the connecting band 43 and the second opening 33 as a center, until the interface part 41 and the connecting band 43 are snap-fitted into the first accommodating space 32 and the second accommodating space 34; then a complete surface is formed by the bottom surface of the interface part 41, the bottom surface of the connecting band 32 and the first surface 11 of the first case 1. In a case that the I/O interfaces are to be used, the above operations are reversed, that is, the interface part 41 and the connecting band 43 are turned outward the first opening 31 and the second opening 33 with the connecting position between the connecting band 43 and the second opening 33 as a center, until the I/O interfaces of the interface part 41 are exposed and convenient to connect to an external device. The I/O interfaces 42 may be disposed on any surface of the interface part 41 except the bottom surface 411, as long as the I/O interfaces can be concealed inside the first accommodating space 32 when the interface part 41 is snap-fitted into the first accommodating space 32. Therefore, in a case that the I/O interfaces are not used, the interface part 41 can be completely concealed and pollution from dust and dirt can be avoided, so as to ensure connection performance of the I/O interface 42. In addition, in a case that the interface part 41 is not used, the interface part is snap-fitted into the first accommodating space 32 to be concealed, which avoids exposed openings on the laptop, and a complete surface is formed by the bottom surface 411 of the interface part 41 and the first surface 11 of the first case 1, so that external structure of the electronic device is regular and simple. In addition, the first accommodating space 32 is disposed on a position of the first surface 11 with enough thickness to conceal the interface part 41, rather than disposed on the thin edge which can not accommodate the thick interface part 41, therefore, the development of super-thin edge is not affected by the interface part 41, and thus better appearance and portability are ensured.

Third Embodiment

Figure 4:
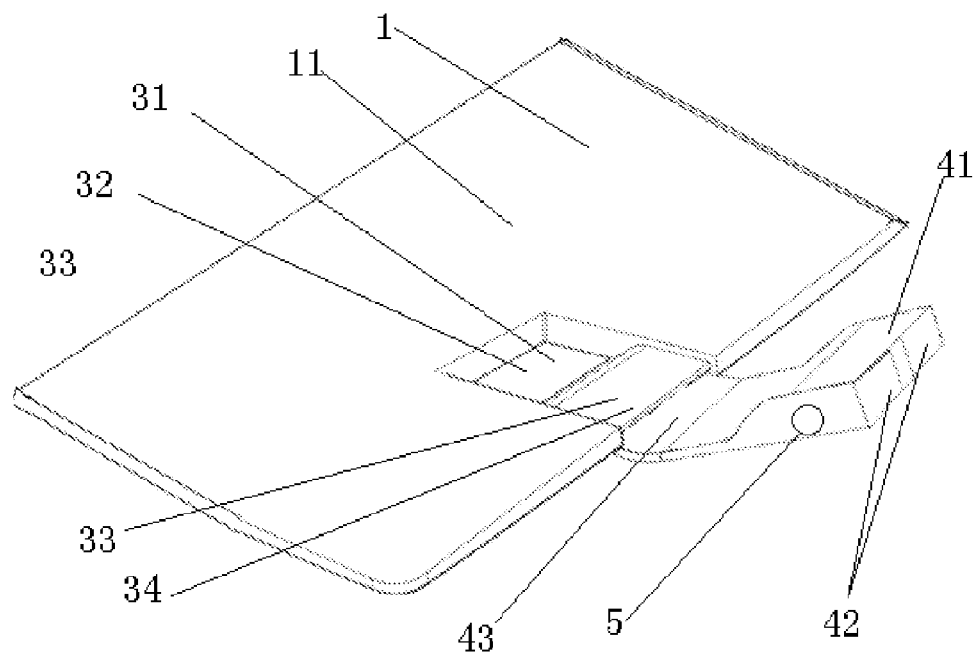
FIG. 4 is a schematic structural diagram of an electronic device according to anther embodiment of the disclosure, In these drawings, 1 represents a first case, 11 represents a first surface of the first case, 12 represents a second surface of the first case, 2 represents a second case, 31 represents a first opening, 32 represents a first accommodating space, 33 represents a second opening, 34 represents a second accommodating space, 41 represents an interface part, 411 represents a bottom surface of the interface part, 42 represents an I/O interface, 43 represents a connecting band, 5 represents a magnet, and 6 represents a bulge.

As shown in FIG. 4, an electronic device, which is a mobile phone in the embodiment, is provided according to the embodiment of the disclosure. A surface opposite to a surface where a keyboard is located is a first surface 11 of a first case 1, which is a back cover of the mobile phone. A first opening 31 is disposed on a non-edge part of the back cover, and an inner part of the first opening is a first accommodating space 32. A second opening 33 connecting with the first opening 31 is disposed on the first surface 11, and an end of the second opening 33 is located on an edge of the mobile phone. The second opening 33 is a groove structure, viewing from the side of the mobile phone. A connecting band made of flexible material is connected to the groove, and the connecting band has two surfaces which are perpendicular to each other; one surface entirely covers the groove of the second opening 33 from the side of the mobile phone, and the other surface is right above the second opening 33 and entirely covers the second opening 33 from the top, so that the connecting band 43 is completely adapted to the second opening 33, and a complete surface is formed. The other end of the connecting band 43 is connected to the interface part 41. The interface part 41 is provided with one or more I/O interfaces 42, which are configured to connect to an external device to transmit information. For better appearance, the whole mobile phone generally has an arc-shaped case, that is, core components such as circuit boards are disposed in the middle part of the mobile phone, and the edge is designed to be thin. In this case, the first opening 31 is disposed on a non-edge position close to the middle of the laptop, which is generally thick and is large enough to accommodate the thick I/O interfaces. In a case that the I/O interfaces are not used, the interface part 41 and the connecting band 43 are turned toward the first opening 31 and the second opening 33 with a connecting position between the connecting band 43 and the second opening 33 as a center, until the interface part 41 and the connecting band 43 are snap-fitted into the first accommodating space 32 and the second accommodating space 34; then a complete surface is formed by the bottom surface of the interface part 41, the bottom surface of the connecting band 43 and the first surface 11 of the first case 1. In a case that the I/O interfaces are to be used, the above operations are reversed, that is, the interface part 41 and the connecting band 43 are turned outward the first opening 31 and the second opening 33 with a connecting position between the connecting band 43 and the second opening 33 as a center, until the I/O interfaces 42 of the interface part 41 are exposed and convenient to connect to an external device. The I/O interfaces 42 may be disposed on any surface of the interface part 41 except the bottom surface 411, as long as the I/O interfaces can be concealed inside the first accommodating space 32 when the interface part 41 is snap-fitted into the first accommodating space 32. Therefore, in a case that the I/O interfaces 42 are not used, the interface part 41 can be completely concealed and pollution from dust and dirt can be avoided, so as to ensure connection performance of the I/O interface 42. In addition, in a case that the interface part 41 is not used, the interface part is snap-fitted into the first accommodating space 32 to be concealed, which avoids exposed openings on the mobile phone, and a complete surface is formed by the bottom surface 411 of the interface part 41 and the first surface 11 of the first case 1, so that external structure of the electronic device is regular and simple. In addition, the first accommodating space 32 is disposed on a position of the first surface 11 with enough thickness to conceal the interface part 41, rather than disposed on the thin edge which can not directly accommodate the thick interface part 41, therefore, the development of super-thin edge is not affected by the interface part 41, and thus better appearance and portability are ensured.

Similarly, the electronic device may also be an electrical device in which a keyboard and a display screen are integrated into one case, such as a PAD.

The foregoing embodiments are only preferred embodiments of the disclosure and are not intent to limit the disclosure. Modifications, equivalent replacements and improvements within the spirit and the principle of the disclosure all fall within the scope of the disclosure.

The invention claimed is:

1. An electronic device, comprising:
  a first case having a first accommodating space, wherein a first surface of the first case has a first opening for the first accommodating space; and
  an interface part having a bottom surface, wherein the bottom surface has a same shape with the first opening, the bottom surface is a cross section with a greatest area of the interface part, M I/O interfaces are disposed inside the interface part and connecting ports of the M I/O interfaces are exposed on a first surface of the interface part which is not the bottom surface, M is an integer greater than or equal to 1; the M I/O interfaces are connected to a circuit board located inside the first case, wherein in a case that the interface part is entirely accommodated in the first accommodating space through the first opening, a complete surface is formed by the bottom surface of the interface part and the first surface of the first case, and the first surface of the interface part is accommodated in the first accommodating space; and in a case that the interface part is separated from the first accommodating space through the first opening, the first surface of the interface part is exposed, wherein in a case that a thickness of the interface part is greater than a thickness of a first part of the first case on which the first accommodating space is located in a reference direction, the first accommodating space of the first case extends toward a second surface of the first case to form a bulge, and in a case that the interface part is entirely accommodated in the first accommodating space through the first opening, a complete surface is formed by the bottom surface of the interface part and the first surface of the first case; and the bulge is further configured to support the electronic device via a supporting plane.

2. The electronic device according to claim 1, wherein the electronic device further comprises:

a connecting band made of flexible material, wherein a first end of the connecting band made of flexible material is fixedly connected to the interface part, and a second end of the connecting band made of flexible material is fixedly connected to the first case, wherein the connecting band made of flexible material is configured to keep a connection state between the interface part and the electronic device in a case that the interface part is separated from the first accommodating space through the first opening.

3. The electronic device according to claim 2, wherein the connecting band made of flexible material comprises an electronical connecting wire of the M I/O interfaces, wherein the electronical connecting wire of the M I/O interfaces is electronically connected to the circuit board.

4. The electronic device according to claim 2, wherein the first case comprises a second accommodating space and a second opening for the second accommodating space, wherein the second opening has a same shape with the connecting band made of flexible material, wherein the second opening is connected to the first opening and the second accommodating space is connected to the first accommodating space, and wherein in a case that the interface part is entirely accommodated in the first accommodating space through the first opening, the connecting band made of flexible material is entirely accommodated in the second accommodating space through the second opening, and a bottom surface of the connecting band made of flexible material completely covers the second opening.

5. The electronic device according to claim 4, wherein at least the bottom surface of the interface part is made of flexible material, the interface part and the connecting band made of flexible material are molded in one body; in a case that the interface part is entirely accommodated in the first accommodating space through the first opening and the connecting band made of flexible material is entirely accommodated in the second accommodating space through the second opening, a complete surface is formed by the bottom surface of the interface part, the bottom surface of the connecting band made of flexible material and the first surface of the first case, or at least the bottom surface of the interface part and the first surface of the first case are made of flexible material; in a case that the interface part is entirely accommodated in the first accommodating space through the first opening and the connecting band made of flexible material is entirely accommodated in the second accommodating space through the second opening, a complete surface with a consistent appearance is formed by the bottom surface of the interface part, the bottom surface of the connecting band made of flexible material and the first surface of the first case.

6. The electronic device according to claim 4, wherein a thickness of a second part of the first case in the reference direction is smaller than the thickness of the first part of the first case in the reference direction, and the second accommodating space is located on the second part.

7. The electronic device according to claim 1, wherein the electronic device further comprises a magnet disposed on the interface part, and the interface part is entirely accommodated in the first accommodating space through the first opening by the magnet.

8. The electronic device according to claim 1, wherein the first surface of the first case is a surface of the first case where a display screen is not exposed.

9. The electronic device according to claim 8, wherein the electronic device further comprises a second case, wherein the second case comprises at least a display unit, and the display screen of the display unit is exposed through a first surface of the second case; the second case is rotatably connected to the first case; and in a case that the second case and the first case are in a first relative position, the first surface of the second case is opposite to the first surface of the first case.

* * * * *